United States Patent
Dunn et al.

(10) Patent No.: US 10,931,176 B2
(45) Date of Patent: Feb. 23, 2021

(54) ELECTRIC MACHINE THERMAL MANAGEMENT

(71) Applicant: Ford Global Technologies, LLC, Dearborn, MI (US)

(72) Inventors: Casey Taylor Dunn, Brownstown Charter Township, MI (US); Daniel Frank Sheldon, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 16/055,799

(22) Filed: Aug. 6, 2018

(65) Prior Publication Data

US 2020/0044517 A1    Feb. 6, 2020

(51) Int. Cl.
*H02K 11/25* (2016.01)
*B60L 3/00* (2019.01)
*H02K 5/22* (2006.01)

(52) U.S. Cl.
CPC ............ *H02K 11/25* (2016.01); *B60L 3/0061* (2013.01); *H02K 5/225* (2013.01); *B60L 2240/425* (2013.01)

(58) Field of Classification Search
CPC . H02K 11/25; H02K 3/12; H02K 3/50; H02K 9/24
See application file for complete search history.

(56) References Cited

U.S. PATENT DOCUMENTS

| 4,890,025 | A  | * | 12/1989 | Hadeler ................. H02K 11/25 310/68 C |
| 6,639,505 | B2 | * | 10/2003 | Murata ..................... G01K 7/22 338/25 |
| 8,810,091 | B2 | * | 8/2014  | Sato ........................ H02K 7/006 310/71 |
| 9,735,659 | B2 |   | 8/2017  | Koizumi et al. |
| 9,772,234 | B2 | * | 9/2017  | Suzuki ..................... G01K 7/22 |
| 2017/0054346 | A1 |   | 2/2017 | Matsumoto |
| 2017/0271940 | A1 |   | 9/2017 | Hanumalagutti et al. |
| 2017/0271951 | A1 |   | 9/2017 | Hanumalagutti et al. |
| 2017/0271954 | A1 |   | 9/2017 | Hanumalagutti et al. |
| 2017/0279329 | A1 |   | 9/2017 | Hanumalagutti et al. |
| 2017/0324307 | A1 |   | 11/2017 | Roberts et al. |

FOREIGN PATENT DOCUMENTS

FR    2995741 A1    3/2014
JP    2016046937 A   4/2016

* cited by examiner

*Primary Examiner* — Dang D Le
(74) *Attorney, Agent, or Firm* — David B. Kelley; Brooks Kushman P.C.

(57) ABSTRACT

An electric machine for an electrified vehicle includes a stator including windings and a bridge extending across the windings and in engagement with the windings. The electric machine further includes a temperature sensor assembly secured to the bridge. The temperature sensor assembly includes a retention housing having a base and spaced apart retention arms extending from the base. The temperature sensor assembly further includes a temperature sensor disposed within the retention housing. An adhesive is disposed between the retention housing and the bridge.

20 Claims, 10 Drawing Sheets

ELECTRIC MACHINE THERMAL MANAGEMENT

TECHNICAL FIELD

The present disclosure relates to thermal management systems for electric machines of electrified vehicles.

BACKGROUND

Extended drive range technology for electrified vehicles, such as battery electric vehicles ("BEVs") and plug in hybrid vehicles ("PHEVs"), is continuously improving. Achieving these increased ranges, however, often requires traction batteries and electric machines to have higher power outputs, and associated thermal management systems to have increased capacities in comparison to previous BEVs and PHEVs.

SUMMARY

In at least one approach, an electric machine for an electrified vehicle is provided. The electric machine may include a stator including windings and a bridge extending across the windings and in engagement with the windings. The electric machine may further include a temperature sensor assembly secured to the bridge. The temperature sensor assembly may include a retention housing having a base and spaced apart retention arms extending from the base. The temperature sensor assembly may further include a temperature sensor disposed within the retention housing. An adhesive may be disposed between the retention housing and the bridge.

In at least one approach, a method of securing a temperature-sensing assembly to stator windings is provided. The method may include applying an adhesive to at least one of (i) an inner surface of a temperature sensor assembly that houses the temperature sensor and (ii) a surface of a bridge that extends across windings of a stator. The method may further include engaging the bridge with resiliently flexible arms of the temperature sensor assembly to deform the resiliently flexible arms. The method may further include engaging the bridge with the inner surface.

In at least one approach, temperature sensor assembly for an electric machine is provided. The temperature sensor assembly may include a C-shaped retention housing including a retention base and spaced apart resilient retention arms extending from the retention base. The retention housing may further include opposing distal end clips extending inwardly at distal portions of the resilient retention arms. The temperature sensor assembly may further include a temperature sensor disposed within the retention housing. The temperature sensor assembly may further include a wire guide extending from the retention housing.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
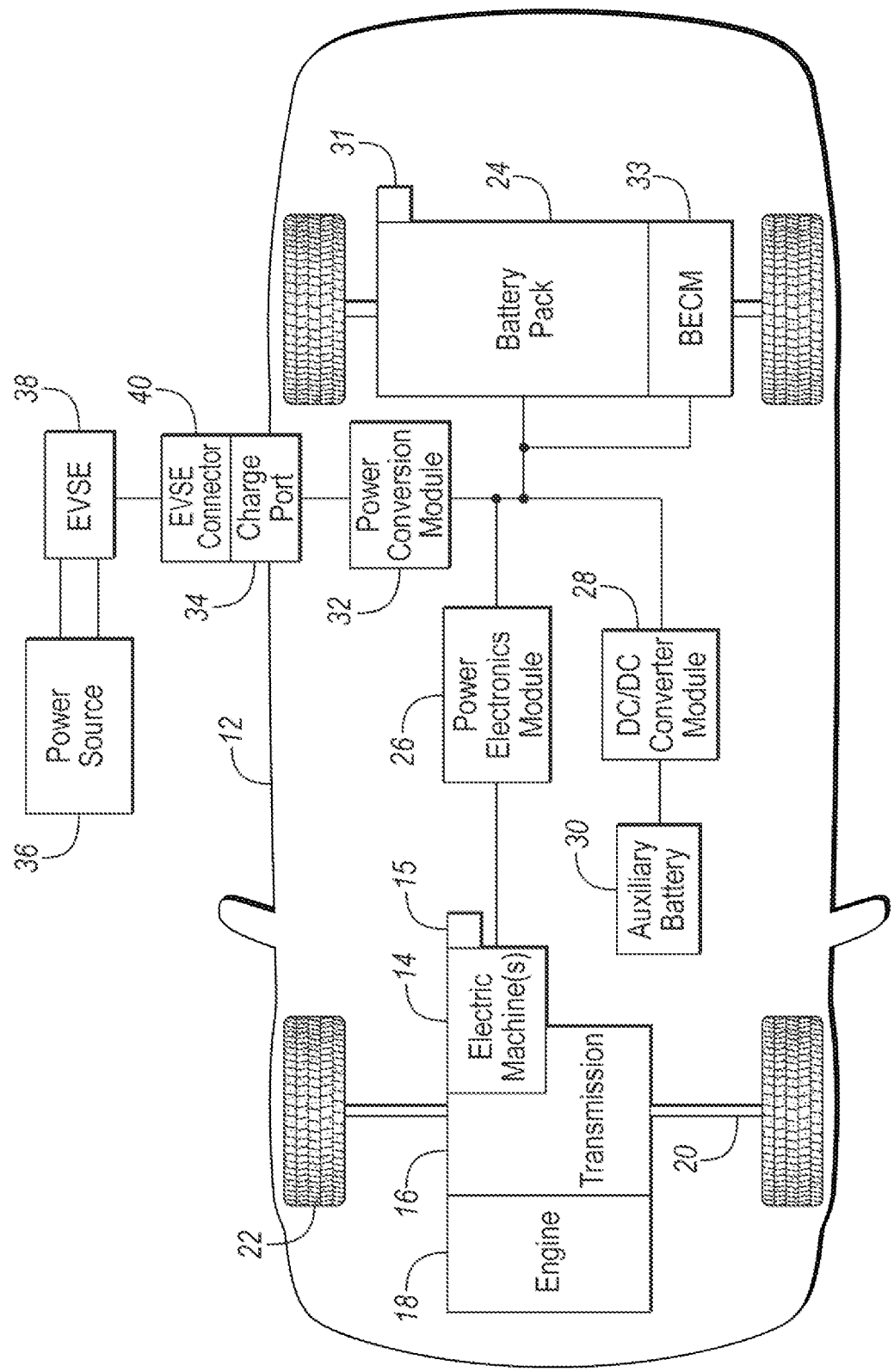
FIG. 1 is a schematic diagram illustrating an example of an electrified vehicle.

FIG. 1 depicts a schematic of an example of a plug-in hybrid electric vehicle (PHEV), referred to as a vehicle 12 herein. While FIG. 1 depicts a PHEV, embodiments within the scope of the present invention may be implemented in a full hybrid electric vehicle (FHEV), mild hybrid electric vehicle (MHEV), battery electric vehicle (BEV), or other types of vehicles as appropriate.

The vehicle 12 may comprise one or more electric machines 14 mechanically connected to a hybrid transmission 16. The electric machine 14 may be capable of operating as a motor and/or a generator. In addition, the hybrid transmission 16 may be mechanically connected to an engine 18. The hybrid transmission 16 may also be mechanically connected to a drive shaft 20 that is mechanically connected to the wheels 22. The electric machines 14 may provide propulsion and deceleration capability when the engine 18 is turned on or off. The electric machines 14 may also act as generators and may provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

As discussed in greater detail elsewhere herein, the electric machine 14 may have a temperature sensor 15 such as a thermistor or other temperature gauge. The temperature sensor 15 may be in communication with a controller or module 33 to provide temperature data regarding the electric machine 14. The controller or module 33 may be an inverter system controller (ISC) or battery electrical control module (BECM). The temperature sensor 15 may also, or instead, be in communication with one or more power electronics modules (e.g., PEM 26). It is also contemplated that more than one temperature sensor 15 may be used to monitor temperature of the electric machine 14.

A traction battery or battery pack 24 stores and provides energy that may be used by the electric machines 14. The traction battery 24 may provide a high voltage DC output from one or more battery cell arrays, sometimes referred to as battery cell stacks, within the traction battery 24. The battery cell arrays may include one or more battery cells. The traction battery 24 may be electrically connected to one or more power electronics modules 26 through one or more contactors (not shown). The one or more contactors isolate the traction battery 24 from other components when opened and connect the traction battery 24 to other components when closed. The ISC and/or power electronics module 26 may also be electrically connected to the electric machines 14 and provides the ability to bi-directionally transfer electrical energy between the traction battery 24 and the electric machines 14. For example, the traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A DC/DC converter module 28 may convert high voltage DC output of the traction battery 24 to a low voltage DC supply that is compatible with other vehicle loads. Other high-voltage loads, such as compressors and electric heaters, may be connected directly to the high-voltage without the use of the DC/DC converter module 28. The low-voltage systems may be electrically connected to an auxiliary battery 30 (e.g., 12V battery).

The ISC and/or battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the ISC and/or BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

Figure 2:
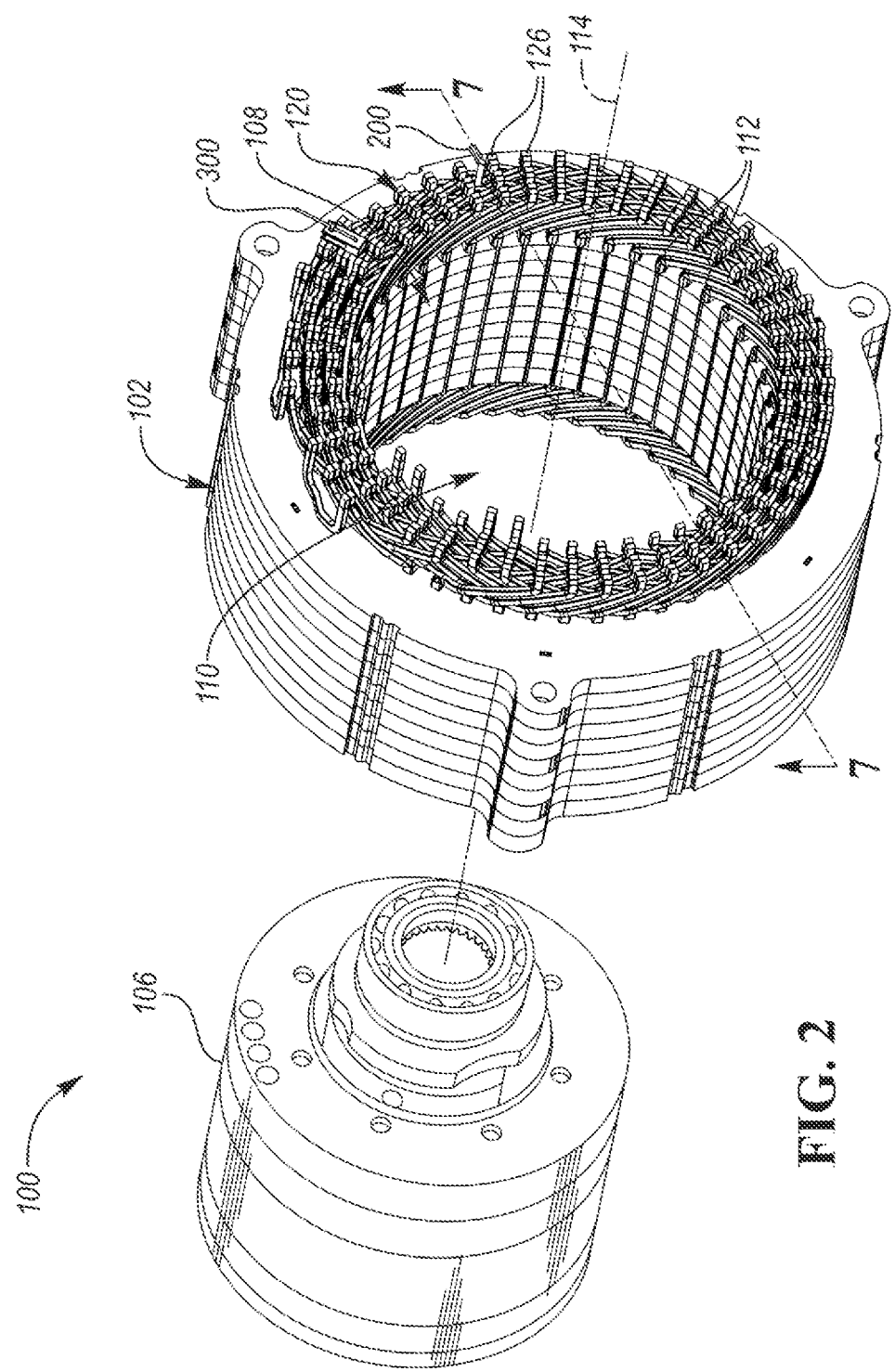
FIG. 2 is a perspective, exploded view illustrating an example of a portion of an electric machine assembly.

FIG. 2 shows an example of an electric machine 100 for an electrified vehicle. The electric machine 100 may include a stator core 102 and a rotor 106. Some electrified vehicles may include two such electric machines. One of the electric machines may function primarily as a motor and the other may function primarily as a generator. The motor may operate to convert electricity to mechanical power and the generator may operate to convert mechanical power to electricity. The stator core 102 may be made from a plurality of laminated steel segments, which may be welded together. The stator core 102 may define an inner surface 108 and a cavity 110. The rotor 106 may be sized for disposal and operation within the cavity 110. A shaft (not shown) may be operably connected to the rotor 106 to drive rotation thereof. The stator core 102 may extend about a central axis 114. The rotor 106 may rotate about the central axis 114.

A plurality of slots 112 may be provided along the inner surface 108. The slots 112 may be formed, for example, between a plurality of teeth extending inward from the inner surface 108. Windings 120 may at least partially extend within or be disposed within the slots 112. In at least one approach, the windings 120, per circuit or phase, may be a continuous wire that is disposed into one respective slot 112, turn through 180 degrees near the end of the respective slot 112, then run along another slot 112. Multiple windings may be provided in each slot 112.

As shown, one or more of the windings 120 may have a cross-section that may be polygonal. More particularly, the cross-section may define a quadrilateral, which may be a parallelogram (e.g., a rectangle, square, rhombus, etc.), trapezoid, kite, etc.

In an electric machine motor example, current may be fed to the windings 120 to obtain a rotation force on the rotor 106. In an electric machine generator example, current generated in the windings 120 by a rotation of the rotor 106 may be removed to power vehicle components. At each end of the stator 102, winding ends 126 may be formed in the regions in which the wire of the wire windings 120 protrude from the slots 112. During operation of the electric machine 100, heat may be generated along the windings 120 and end windings 126.

To monitor temperatures at the stator, various strategies may be implemented. For example, a housing may be over-molded onto a magnet wire. In another approach, a stamped bracket may apply a spring force onto a thermistor to maintain contact with the magnet wire. In another approach, a lacing cord may tie the thermistor to the magnet wire. In still another approach, a clip-on design may be implemented. Such approaches may require customized tooling equipment and additional components, and may require packaging specifications that may not be suitable to manufacturing.

In still another approach, one or more temperature sensor assemblies, which may also be referred to as temperature-sensing assemblies, may be provided at the windings 120. Although two temperature sensor assemblies 200, 300 are shown in FIG. 2, it is expressly contemplated that a single temperature sensor assembly may be provided for a single stator 102. Furthermore, it is expressly contemplated that more than two temperature sensor assemblies may be provided for a single stator 102.

Referring now to FIGS. 3-6, a temperature sensor assembly 200 is shown. The temperature sensor may include an elongated housing 202. The elongated housing 202 may be a cylindrical or tubular housing that may extend along an axis. The elongated housing 202 may have an anchor portion 204 and a lead portion 206. The elongated housing 202 may be formed, for example, of a polymer that may be capable of withstanding high temperatures for sustained periods of time.

In at least one approach, the temperature sensor assembly 200 includes a head portion 208. The head portion 208 may extend from the elongated housing 202; e.g., from the lead portion 206. For example, the head portion 208 may extend orthogonally from the elongated housing 202 such that the head portion 208 and the elongated housing 202 form a substantially 90-degree angle therebetween. The head portion 208 may have a cross-section that may define a quadrilateral. In this way, the temperature sensor assembly 200 may include a cylindrical elongated housing 202, and a non-cylindrical head portion 208 extending therefrom.

Figure 3:
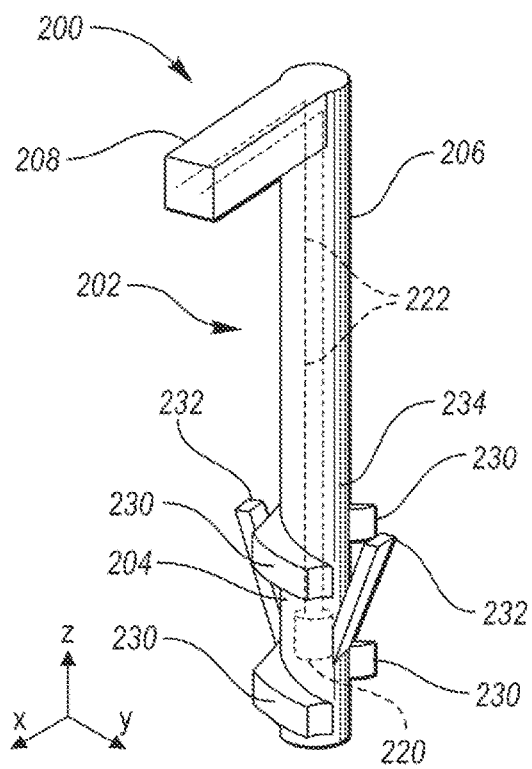
FIG. 3 is a perspective view of a temperature sensor assembly.
Figure 4:
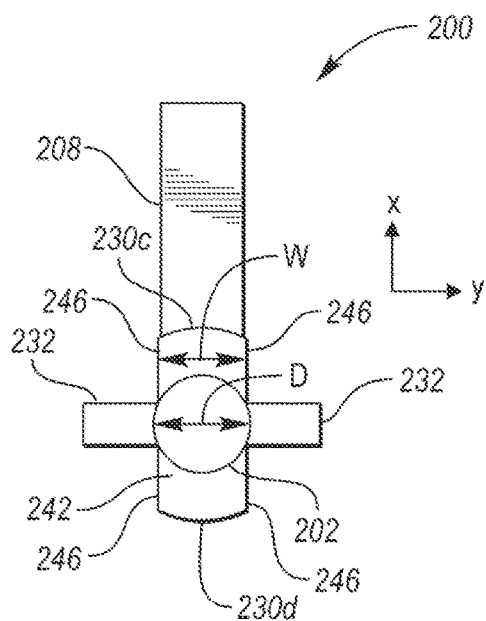
FIG. 4 is a bottom plan view of the temperature sensor assembly of FIG. 3.

As shown in FIG. 3, the temperature sensor assembly 200 may include a temperature sensor 220. The temperature sensor 220 may be, for example, a thermistor. The temperature sensor 220 may be disposed within the elongated housing 202; for example, at or proximate the anchor portion 204.

One or more lead wires 222 (e.g., two lead wires 222) may also be disposed within the elongated housing 202. The lead wires 222 may extend from the temperature sensor 220 and through the lead portion 206. In at least one approach, the lead wires 222 may extend from the temperature sensor 220, through the lead portion 206, and through the head portion 208.

In at least one approach, the elongated housing 202 and/or the head portion 208 may be overmolded about one or both of the temperature sensor 220 and the lead wires 222.

The temperature sensor assembly 200 may include features such as a screw thread 230 and/or a tab 232. As shown, the features may be disposed proximate the anchor portion 204. For example, one or more screw threads 230 may extend about an outer perimeter 234 of the elongated housing 202.

Figure 5:
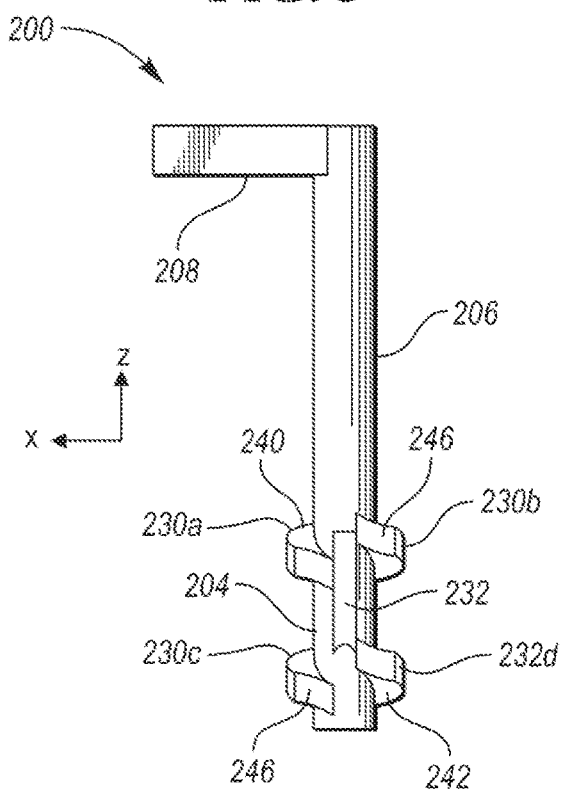
FIG. 5 is a side elevation view of the temperature sensor assembly of FIG. 3.
Figure 6:
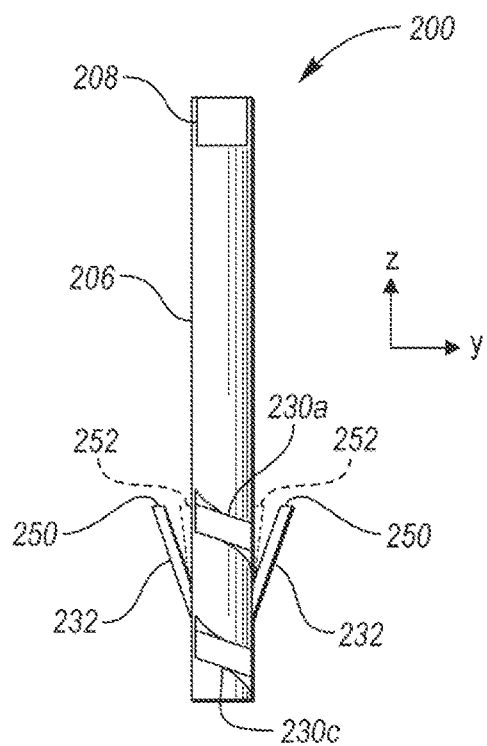
FIG. 6 is a front elevation view of the temperature sensor assembly of FIG. 3.

Referring to FIG. 5, the temperature sensor assembly 200 may include a first set of screw threads 230a, 230b, and a second set of screw threads 230c, 230d. The second set of screw threads 230c, 230d may be axially spaced from the first set of screw threads 230a, 230b (e.g., in the Z direction of FIG. 5). In this way, the outer perimeter 234 of the elongated housing 202 is exposed along the axial direction between the first set of screw threads 230a, 230b and the second set of screw threads 230c, 230d.

The screw threads 230 may be ramped screw threads. In this way, the screw threads 230 may include an upper ramp surface 240 and a lower ramp surface 242. The upper ramp surface 240 and/or the lower ramp surface 242 may have a first height along the Z axis, and may slope upwardly or downwardly to a second height along the Z axis that is different than the first height.

In at least one approach, individual screw threads of the first set of screw threads 230a, 230b may extend less than 180° about the outer perimeter 234 of the elongated housing 202. Similarly, wherein individual screw threads of the second set of screw threads 230c, 230d may extend less than 180° about the outer perimeter 234 of the elongated housing 202. The individual screw threads 230c, 230d of the second set of screw threads may be substantially aligned with the individual screw threads 230a, 230b of the first set of screw threads.

In this way, the screw threads 230 may define planar surfaces 246 that may extend, for example, in the X-Z plane of FIG. 5. As such, the upper and lower ramp surfaces 240, 242 of an individual screw thread 230 may extend between two planar surfaces 246 defined by the screw thread 230.

One or more opposing tabs 232 may also or instead extend from the outer perimeter 234 of the elongated housing 202. The tabs 232 may be extend from the elongated housing 202 proximate the screw thread(s) 230. The tabs 232 may be resiliently flexible relative to the elongated housing 202. In this way, the tabs 232 may extend in an extended configuration, as indicated at 250 in FIG. 6, may be adapted to flex to a compressed configuration under load, as indicated at 252, and may be adapted to return to the extended configuration 250 when the load is released. The tabs 232 may be formed, for example, in an injection molding process. As such, the tabs 232 may be injection-molded tabs.

As shown, the screw threads 230 may extend from the outer perimeter 234 of the elongated housing 202 in a first direction (e.g., in the +/−Y direction), and the opposing tabs 232 may extend from the outer perimeter 234 in opposing second and third directions (e.g., in the +/−X direction) that are rotated 90 degrees from the first direction.

Figure 7:
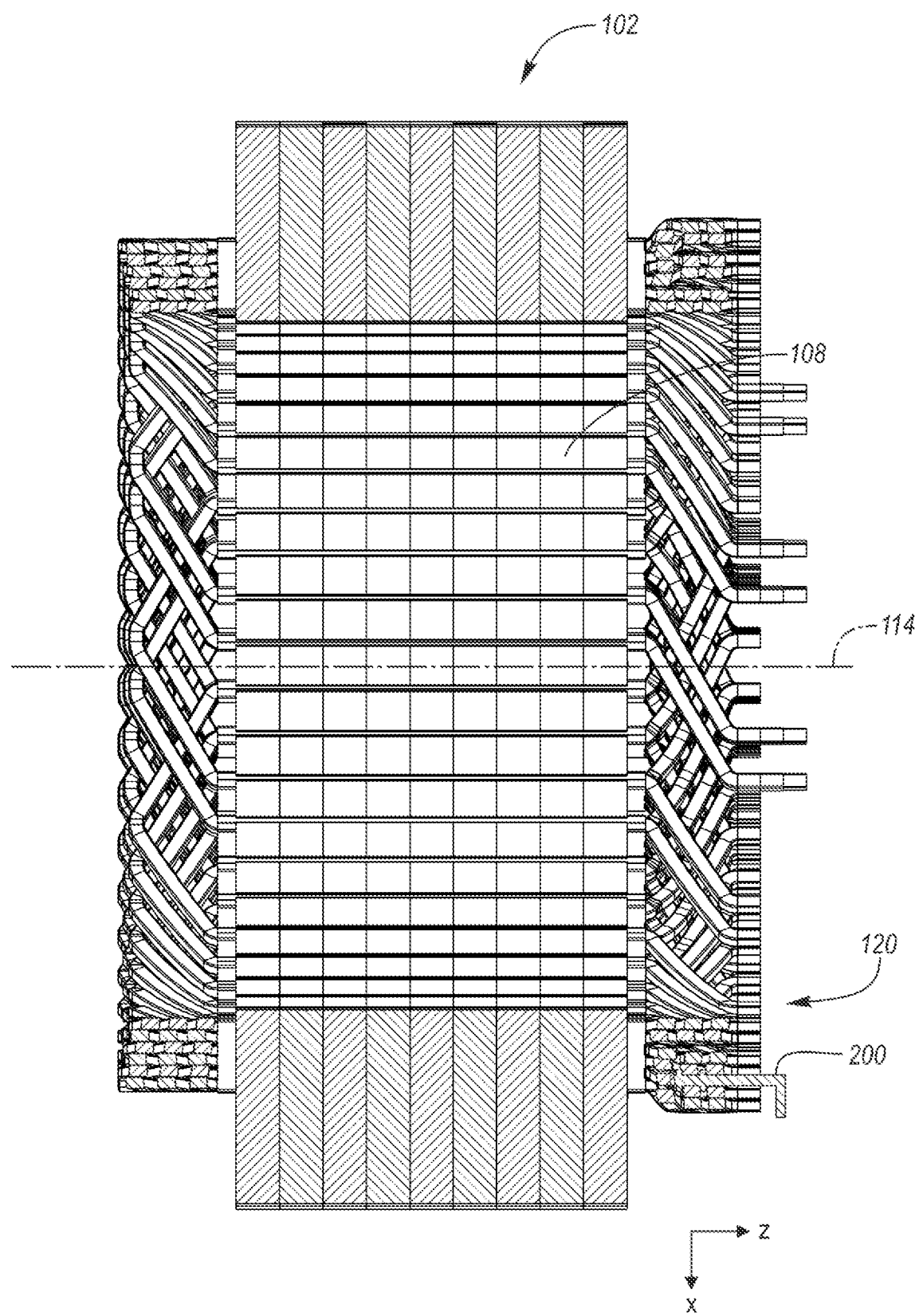
FIG. 7 is a cross-section view of the stator of FIG. 2 taken along the line 7-7 of FIG. 2.

Referring to FIG. 7, the temperature sensor assembly 200 may be installed in a stator 102. As discussed, the stator 102 may include windings 120 that may extend at least partially about a central axis 114.

Figure 8:
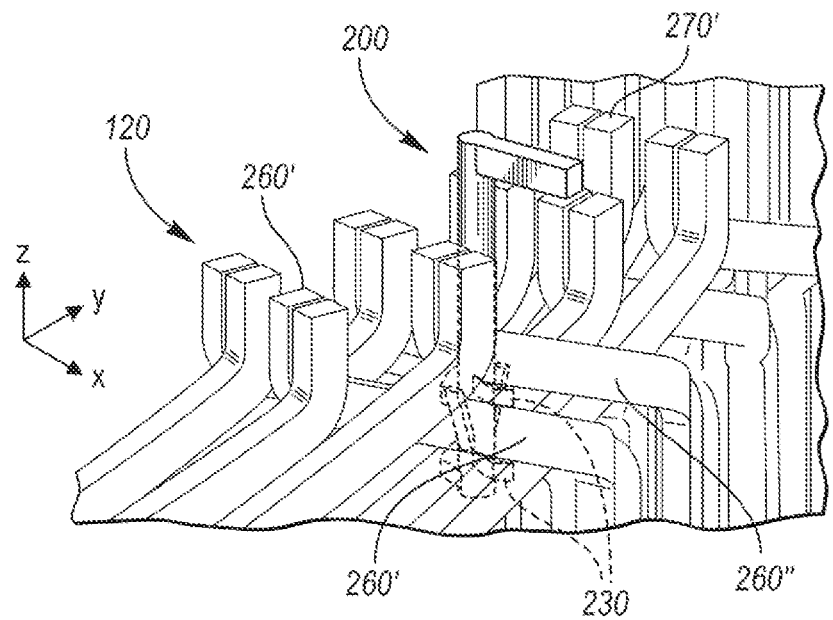
FIG. 8 is a partial perspective view of windings of a stator with the temperature sensor assembly of FIG. 3 installed in the windings.
Figure 9:
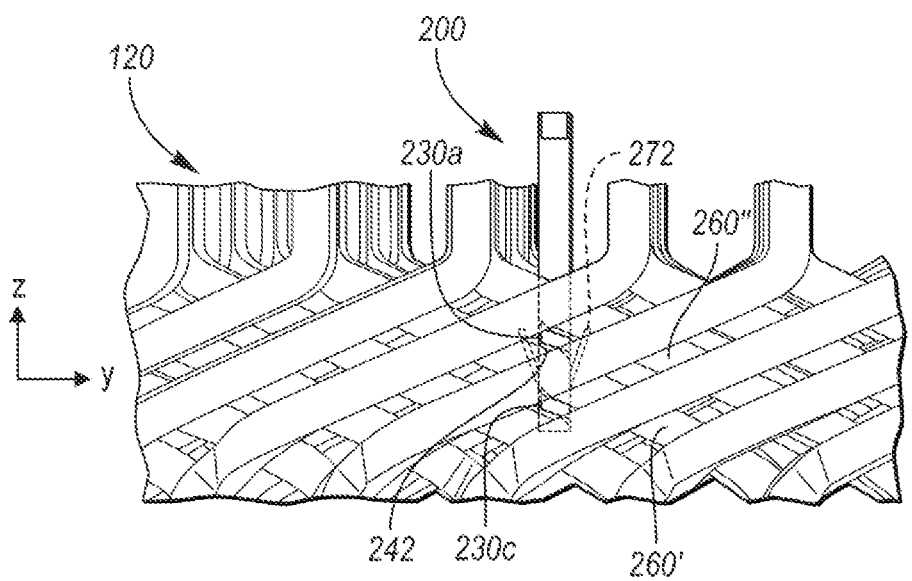
FIG. 9 is a front elevation view of the temperature sensor assembly and windings of FIG. 8.
Figure 10:
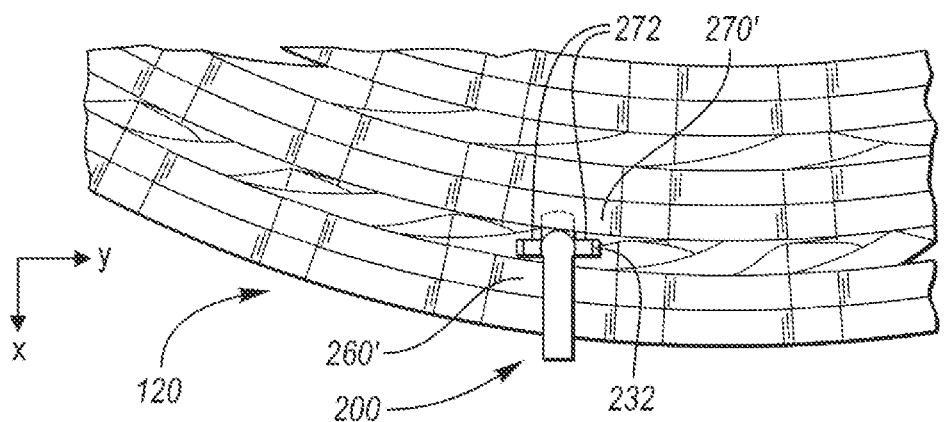
FIG. 10 is a top plan view of the temperature sensor assembly and windings of FIG. 8.

FIGS. 8-10 depict the temperature sensor assembly the installed configuration. As shown in FIGS. 8 and 9, in the installed configuration, one or more screw threads 230 may be axially disposed between axially spaced apart portions of axially adjacent windings, such as windings 260', 260". As used herein, "axially" may refer to the Z direction shown in the figures. In this way, the axially spaced apart portions of axially adjacent windings 260', 260" may be spaced apart in the Z direction.

At least one ramp surface of the screw thread 230, such as a lower ramp surface 242, maybe configured to engage at least one of the axially adjacent windings, such as winding 260'. The engagement of the ramp surface with the winding may restrict axial movement of the temperature sensor assembly 200 relative to one or more of the windings.

In at least one approach, one or more of the ramp surfaces 240, 242 may define an angle of inclination, for example, relative to the X-Y plane. The angle may be, for example, in the range of approximately 15 degrees to approximately 35 degrees, and more particularly, in the range of approximately 18 degrees to approximately 25 degrees, and more particularly, approximately 20 degrees. An adjacent winding may also define an angle of inclination, for example, relative to the X-Y plane. The angle may be, for example, in the range of approximately 15 degrees to approximately 35 degrees, and more particularly, in the range of approximately 18 degrees to approximately 25 degrees, and more particularly, approximately 23 degrees. In this way, the angle of inclination of the ramp surfaces 240, 242 may correspond, or substantially correspond (e.g., +/−5 degrees) to an angle of inclination of at least one axially adjacent winding.

As discussed, the screw threads may include axially spaced apart screw threads (e.g., axially spaced along the elongated housing 202 in the Z direction). In the installed configuration, an individual winding, such as winding 260', may extend between two axially spaced screw threads (e.g., screw threads 230a and 230c).

As shown in FIG. 10, resilient tabs 232 may be radially disposed between radially apart spaced portions of radially adjacent windings, such as windings 260', 270'. The tabs 232 may be disposed such that at least one abutment surface 272 may engage at least one of the radially adjacent windings 260', 270' to restrict radial movement of the temperature sensor assembly 200 relative to the at least one radially adjacent winding.

Referring again momentarily to FIG. 4, a screw thread 230 may define a width W in a direction orthogonal to an axial length of the elongated housing 202. The width W may be less than a diameter D of the elongated housing 202. For example, the width W may be approximately 2.2 millimeters, and the diameter D may be approximately 2.3 millimeters. In at least one approach, the width W may be less than a radial space between the radially adjacent windings 260', 270'. For example, the radially adjacent windings 260', 270' may be radially spaced apart by approximately 2.4 millimeters, approximately 2.6 millimeters, approximately 3.0 millimeters, or more.

In this way, the temperature sensor 220, which may be disposed within the anchor portion 204 of the elongated housing 202, may be secured radially between the radially adjacent windings 260', 270'. More particularly, the outer surface 234 of elongated housing 202 proximate the temperature sensor 220 may be in contact with the radially adjacent windings 260', 270' such that the temperature sensor 220 may receive a temperature indication of the radially adjacent windings 260', 270'. As discussed, the temperature sensor assembly 200 may include a lead portion 206 opposite the anchor portion 204. The lead portion 206 may extends axially beyond end regions of the windings 120. The temperature sensor assembly 200 may further include a head portion 208 that may extend generally orthogonally from the lead portion 206. The temperature leads 222 may extend from the temperature sensor 220 at the anchor portion 204 and to the lead portion 206, and may further extend within the head portion 208. In this way, a temperature reading at the windings 120 may be communicated to a controller of the vehicle.

In at least one approach, a method of securing a temperature-sensing assembly to stator windings is provided. The method may include compressing opposing resilient tabs that extend from an anchor portion of the temperature-sensing assembly. The method may further include inserting the anchor portion between a set of radially spaced stator windings. The method may further include rotating the temperature-sensing assembly such that a screw thread of the anchor portion extends between a set of axially spaced windings and the resilient tabs extend between the set of radially spaced windings.

In at least one approach, the resilient tabs may be adapted engage the radially spaced stator windings in a compressed configuration prior to rotating the temperature-sensing assembly. The resilient tabs may be adapted to flex to an extended configuration between the radially spaced stator windings after rotating the temperature-sensing assembly.

Figure 11:
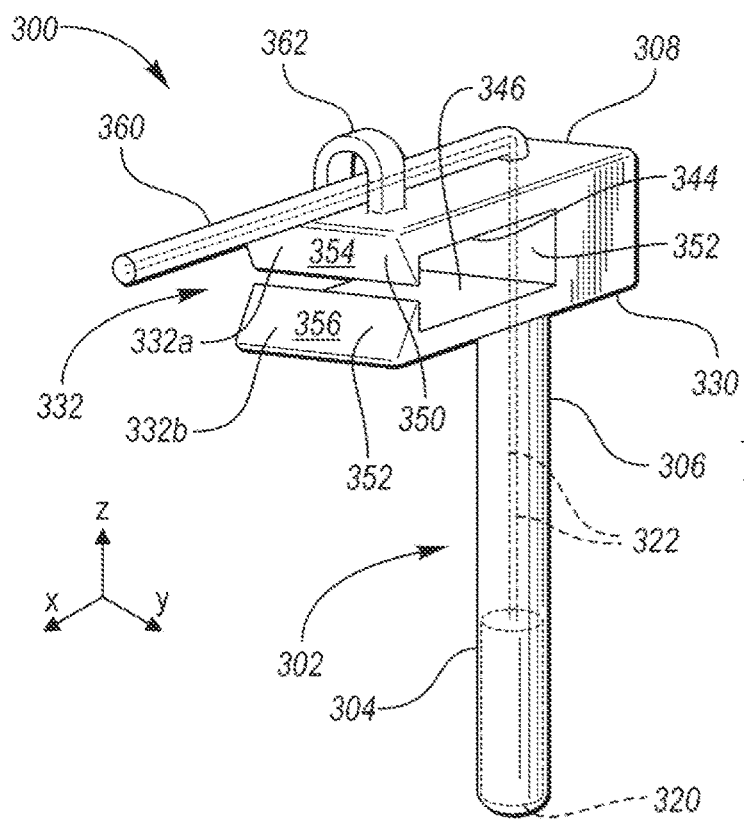
FIG. 11 is a perspective view of another temperature sensor assembly.

Referring now to FIG. 11, a temperature sensor assembly 300 for an electric machine is shown. As discussed, the temperature sensor assembly 300 may be used in conjunction with, or in place of, temperature sensor assembly 200.

The temperature sensor assembly 300 may include an elongated housing 302. The elongated housing 302 may be a cylindrical or tubular housing that may extend along an axis; e.g., central axis 312. The elongated housing 302 may have an anchor portion 304 and a lead portion 306.

In at least one approach, the temperature sensor assembly 300 includes a head portion, referred to herein as a retention body 308. The retention body 308 may extend from the elongated housing 302; e.g., from the lead portion 306 opposite the anchor portion 304. For example, the retention body 308 may extend orthogonally from the elongated housing 302 such that the retention body 308 and the elongated housing 302 form a substantially 90-degree angle therebetween. At least a portion of the retention body 308 may have a cross-section that may define a quadrilateral. In this way, the temperature sensor assembly 300 may include a cylindrical elongated housing 302, and a non-cylindrical retention body 308 extending therefrom.

As shown in FIG. 11, the temperature sensor assembly 300 may include a temperature sensor 320. The temperature sensor 320 may be, for example, a thermistor. The temperature sensor 320 may be disposed within the elongated housing 302; for example, at or proximate the anchor portion 304. In at least one approach, the temperature sensor 320 may be spring-loaded. In this approach, a spring-loaded temperature sensor may provide additional mechanical force so as to promote engagement of the temperature sensor (e.g., through the anchor portion 304) and one or more windings of the stator.

One or more lead wires 322 (e.g., two lead wires 322) may also be disposed within the elongated housing 302. The lead wires 322 may extend from the temperature sensor 320 and through the lead portion 306. In at least one approach, the lead wires 322 may extend from the temperature sensor 320, through the lead portion 306, and through the retention body 308.

In at least one approach, the elongated housing 302 and/or the retention body 308 may be overmolded about one or both of the temperature sensor 320 and the lead wires 322.

The retention body 308 may include a retention base 330 and spaced apart retention arms 332. The retention base 330 may be disposed at an end of the elongated housing 302 opposite the anchor portion 304. The retention arms 332 may extend from the retention base 330. The retention arms 332 may extend in a direction substantially orthogonal to the central axis 312. In at least one approach, the retention arms 332 include a first retention arm 332a and a second retention arm 332b that may be spaced from the first retention arm 332a. The first and second retention arms 332a, 332b may be resiliently deformable retention arms. In this way, the retention arms 332 may be configured to flex relative to the retention base 330; for example, about the Y axis shown in FIG. 11.

As discussed, the second retention arm 332b that may be spaced from the first retention arm 332a. In this way, the first and second retention arms 332a, 332b may define a channel 340 therebetween. In at least one approach, an inner surface 342 of the retention base 330 cooperates with opposing inner surfaces 344, 346 of the first and second retention arms 332a, 332b to at least partially define the channel 340 therebetween. The inner surface 342 of the retention base 330 may be a curved inner surface that may define a radius of curvature. For example, the curved inner surface may define a curvature about the central axis 312 of the elongated housing 302.

The first retention arm 332a may include first distal end clip 350. The first distal end clip 350 may extend in a first direction toward the second retention arm 332b. Similarly, the second retention arm 332b may include a second distal end clip 352. The second distal end clip 352 may extend in a second direction opposite the first direction toward the first distal end clip 350. The first and second distal end clips 350, 352 may include engagement surfaces that at least partially define the channel 340, and ramped surfaces 354, 356 that face opposite the channel 340.

The temperature sensor assembly 300 may further include a wire guide 360. The wire guide 360 may extend from the retention body 308, and may extend along a retention arm 332 away from the elongated housing 302. For example, the wire guide 360 may extend from the retention base 330, and may extend adjacent the first retention arm 332a along an axis substantially parallel to the first retention arm 332a (and orthogonal to the central axis 312). One or more lead wires 322 may extend from the temperature sensor 320, through the elongated housing 302, through the retention body 308, and through the wire guide 360.

In at least one approach, the retention body 308 may further includes a guide router 362. The guide router 362 may extend from the first retention arm 332a. The guide router 362 may be disposed at a distal region of the first retention arm 332a. The guide router 362 may be in the form of an inverted U-shaped guide router having anchor points at the first retention arm 332a, and a curved portion opposite the anchor points. The wire guide 360 may extend through the guide router 362. In this way, the guide router 362 may restrict movement of the wire guide 360 relative to the distal portion of the first retention arm 332a.

Figure 12:
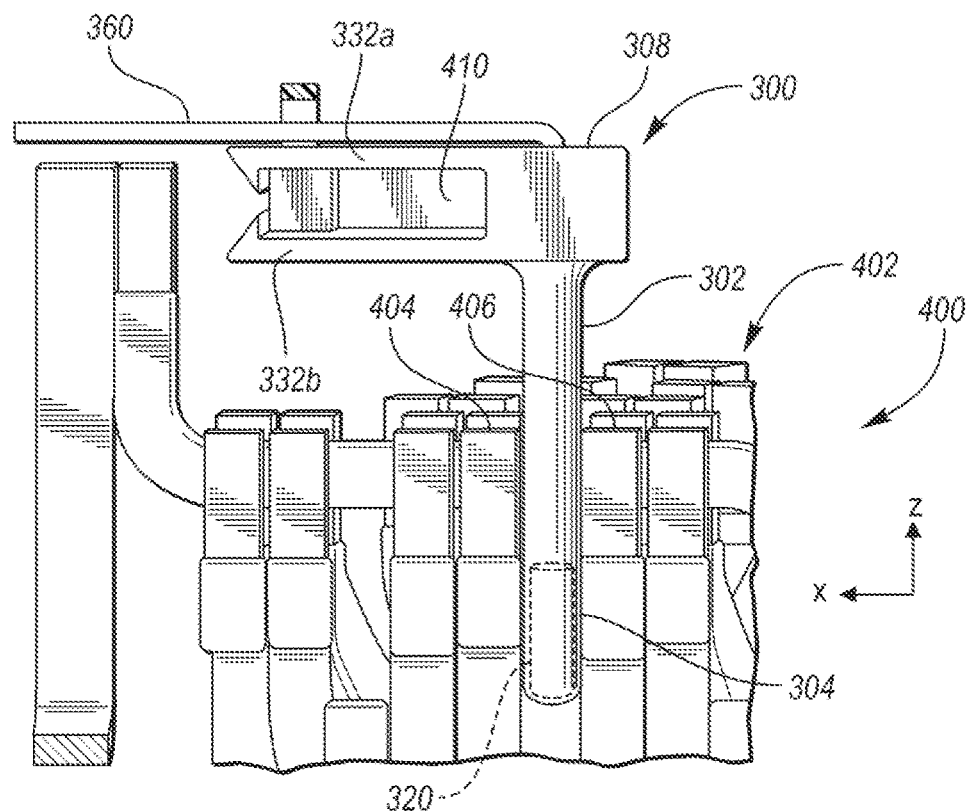
FIG. 12 is a side elevation view of the temperature sensor assembly of FIG. 11 secured to a stator.
Figure 13:
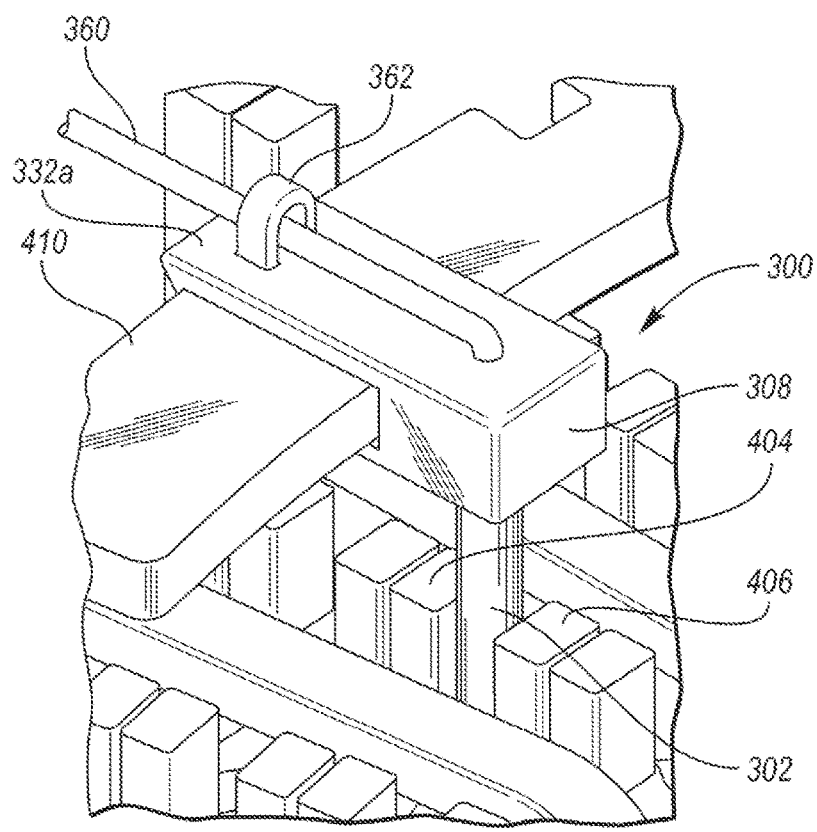
FIG. 13 is a rear perspective view of the temperature sensor assembly of FIG. 11 secured to the stator of FIG. 12.
Figure 14:
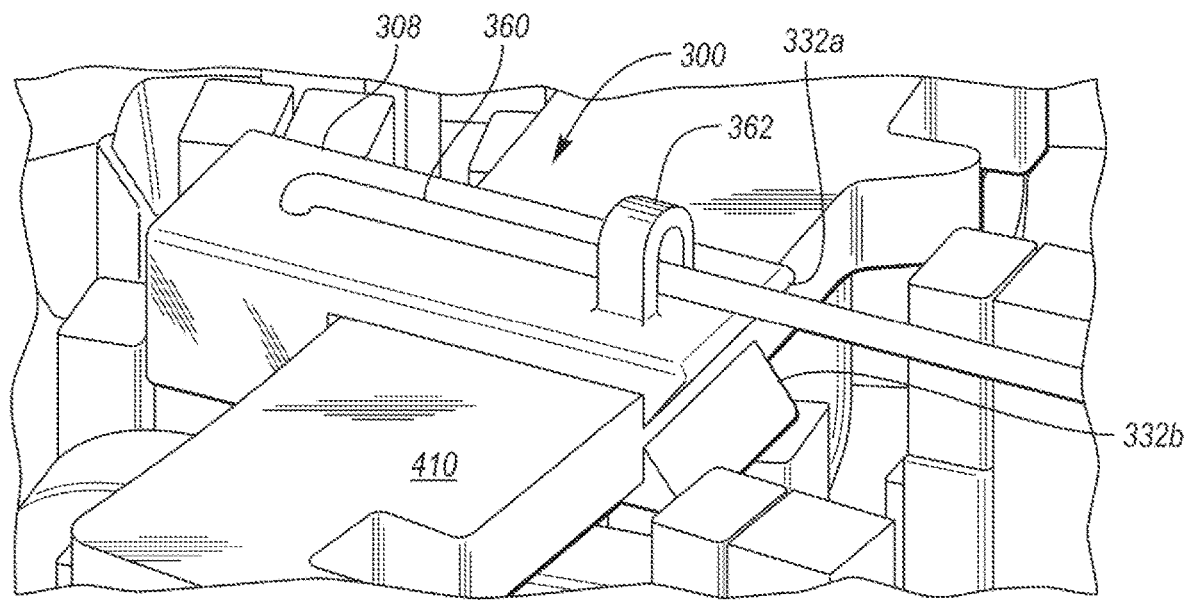
FIG. 14 is a front perspective view of the temperature sensor assembly of FIG. 11 secured to the stator of FIG. 12.

Referring to FIGS. 12-14, the temperature sensor assembly 300 may be installed in an electric machine for an electrified vehicle. For example, the temperature sensor assembly 300 may be secured to a stator 400, and more particularly, proximate windings 402 of the stator 400.

In at least one approach, the anchor portion 304 of the elongated housing 302 may extend between, and may be in contact with, adjacent radially spaced windings; e.g., windings 404, 406. In this way, when the anchor portion 304 is disposed in contact with the windings 404, 406, the temperature sensor 320 housed within the anchor portion 304 may be in thermal communication with the windings 404, 406 such that a temperature of the windings 404, 406 may be measured at the temperature sensor 320.

The retention body 308 may be secured to a stator bridge 410 of the stator 400. The stator bridge 410 may be a component that connects or joins multiple winding endings. In this way, the stator bridge 410 may be formed as a stamped bridge, bus bar, etc. More particularly, stator bridge 410 may be received within the channel 340 (shown in FIG. 11) between the first and second retention arms 332a, 332b. The first and second retention arms 332a, 332b may engage the stator bridge 410. For example, the first and second distal end clips of the first and second retention arms 332a, 332b (e.g., at the engagement surfaces) may maintain an engagement with the stator bridge 410. In this way, the retention body 308 may restrict movement of the temperature sensor assembly 300 in a first direction parallel to the central axis 312 of the elongated housing 302 (e.g., in the Z direction), and in a second direction orthogonal to the first direction (e.g., in the X direction). Furthermore, the curved inner surface 342 of the retention base 330 may compliment a curved surface of the stator bridge 410. The engagement of the curved surfaces may inhibit linear movement of the temperature sensor 300 in a third direction (e.g., in the Y direction). In still another approach, the temperature sensor assembly 300 (e.g., at the retention body 308) may be secured to a stamped portion or bus bar of the stator.

Figure 15:
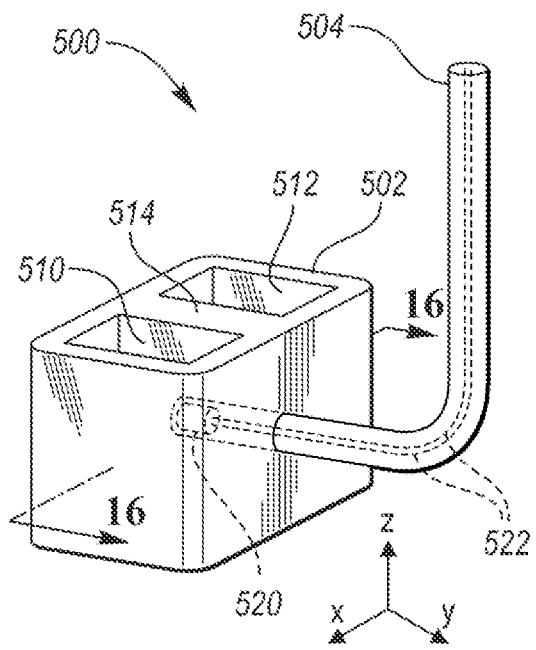
FIG. 15 is a perspective view of another temperature sensor assembly.

Referring now to FIG. 15, a temperature sensor assembly 500 for an electric machine is shown. The temperature sensor assembly 500 may include a sensor body 502 and a wire guide 504 that may extend from the sensor body 502. The sensor body 502 may have one or more, and in at least one approach, a plurality of, through-holes 510, 512 extending therethrough. In at least one approach, the through-holes 510, 512 may be in the shape of quadrilateral through-holes (e.g., in a cross-section along the X-Y plane).

A divider wall 514 may extend between the through-holes 510, 512. The divider wall 514 may have a thickness between the adjacent through-holes 510, 512 that is greater than a diameter or other outer dimension of the wire guide 504.

The temperature sensor assembly 500 may include a temperature sensor 520. The temperature sensor 520 may be, for example, a thermistor. As shown, for example, in FIG. 16, the temperature sensor 520 may be disposed within the divider wall 514 of the sensor body 502. One or more lead wires 522 (e.g., two lead wires 522) may also be disposed within the sensor body 502. The lead wires 522 may extend from the temperature sensor 520 and through the wire guide 504. In at least one approach, the sensor body 502 and/or the wire guide 504 may be overmolded about one or both of the temperature sensor 520 and the lead wires 522.

Figure 16:
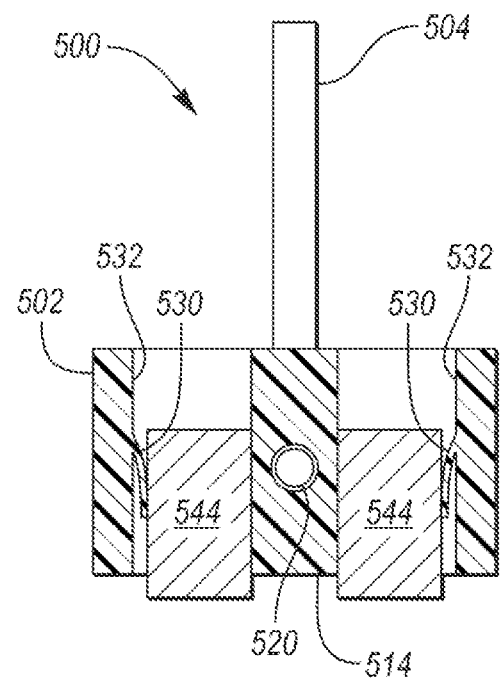
FIG. 16 is a cross-section view of the temperature sensor assembly of FIG. 15 secured to winding endings of a stator.

Referring to FIG. 16, in at least one approach, the sensor body 502 may include one or more resilient tabs 530. The tabs 530 may extend from an inner sidewall 532 of an individual through-hole opposite the divider wall 514. The tabs 530 may be resiliently flexible relative to the inner sidewalls 532 of the sensor body 502. In this way, the tabs 530 may extend in an extended configuration, may be adapted to flex to a compressed configuration under load, and may be adapted to return to the extended configuration when the load is released.

Figure 17:
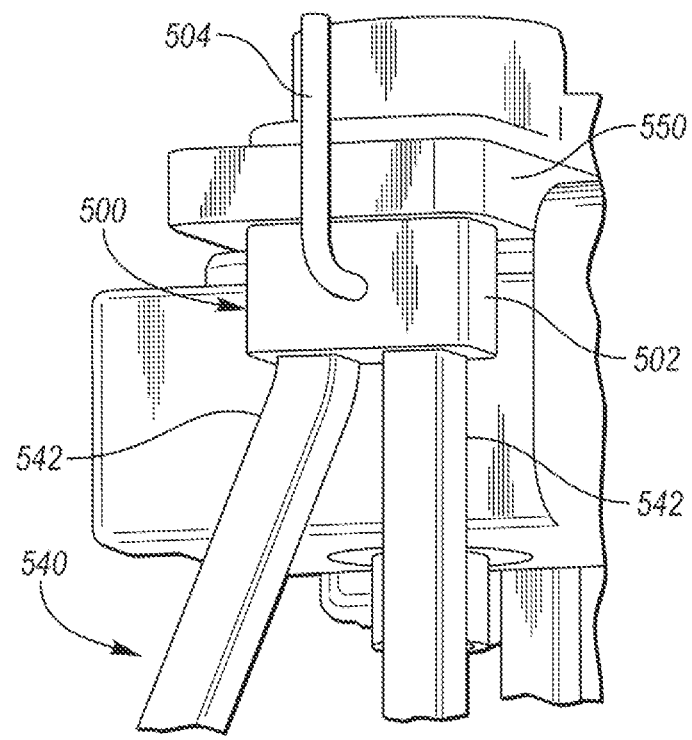
FIG. 17 is a perspective view of the temperature sensor assembly of FIG. 15 secured to a stator.

Referring to FIGS. 16 and 17, the temperature sensor assembly 500 may be installed in an electric machine for an electrified vehicle. For example, the temperature sensor assembly 500 may be secured to a stator 540, and more particularly, proximate windings 542 of the stator 540. More particularly, individual winding endings 544 may be received within the through-holes 510, 512. The winding endings 544 may have quadrilateral cross-sections with outer dimensions that are less than inner dimensions of the quadrilateral through-holes. The individual winding endings 544 may be adjacent winding endings.

As shown in FIG. 16, in an installed configuration, the temperature sensor 520 may be disposed between the adjacent winding endings 544. For example, the individual winding endings may be secured within the through-holes 510, 512 in a friction-fit engagement. One or more resilient tabs 530 may engage the winding endings 544 and may impart a compressive load on the winding endings 544. In this way, the tabs 530 may bias the individual winding endings 544 into engagement with the divider wall 514. As such, the temperature sensor 520 may be in thermal communication with the windings 542 such that a temperature of the windings 542 may be measured at the temperature sensor 520.

In at least one approach, the stator 540 may include a terminal lug 550. A terminal lug 550 may be stamped or formed to connect terminal leads to a terminal block. The terminal lug 550 may be secured to the winding endings 544; for example, by welding the terminal lug 550 to the winding endings 544. The terminal lug 550 may be secured to the winding endings 544 after the temperature sensor assembly 500 has been secured to the winding endings 544. When the terminal lug 550 is secured, the terminal lug 550 may engage the sensor body 502 of the temperature sensor assembly 500 to inhibit movement of the sensor body 502 away from the winding endings 544.

Figure 18:
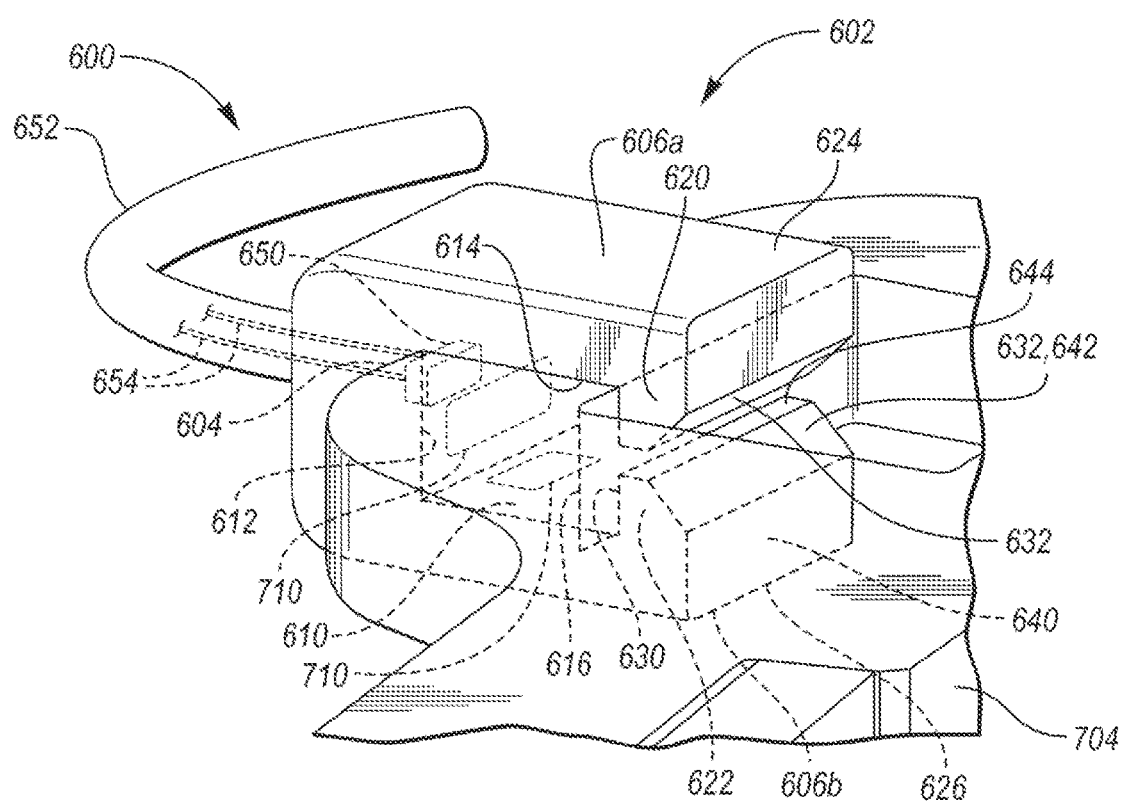
FIG. 18 is a first enlarged perspective view of a temperature sensor assembly secured to a bridge of a stator.
Figure 19:
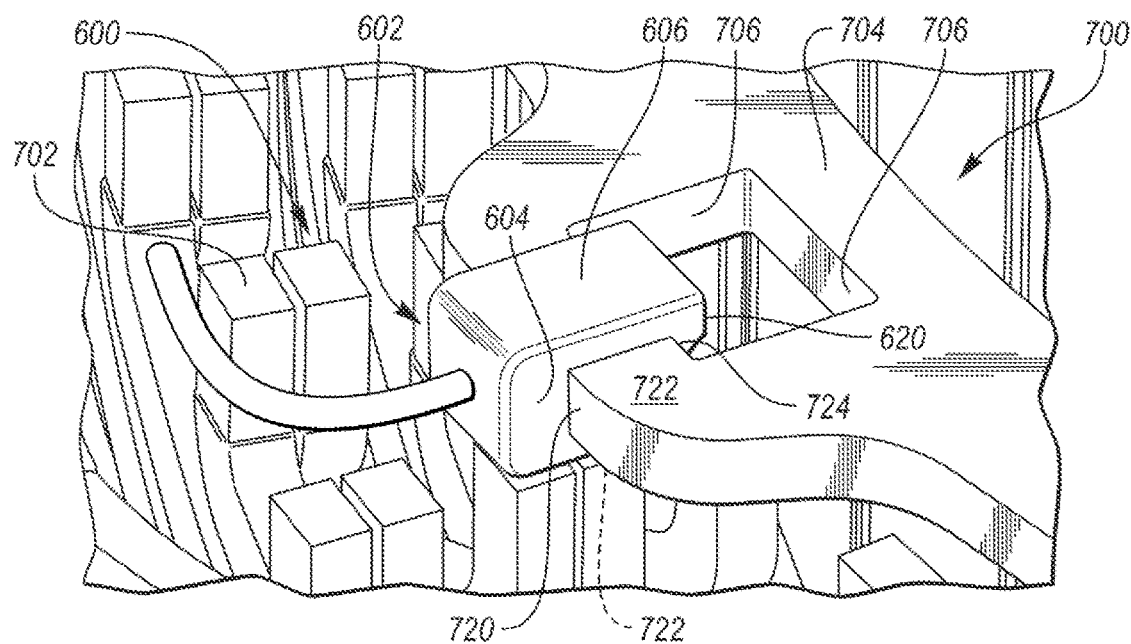
FIG. 19 is a second enlarged perspective view of the temperature sensor assembly of FIG. 18 secured to a bridge of a stator.

Referring now to FIGS. 18 and 19, a temperature sensor assembly 600 for an electric machine is shown. As discussed, the temperature sensor assembly 600 may be used in conjunction with, or in place of, temperature sensor assembly 200.

The temperature sensor assembly 600 may include a retention housing 602, which may be in the form of a C-shaped retention housing. The retention housing 602 may include a retention base 604 and spaced apart retention arms 606. The retention arms 606 may extend from the retention base 604.

In at least one approach, the retention arms 606 include a first retention arm 606a and a second retention arm 606b that may be spaced from the first retention arm 606a. In this way, the first and second retention arms 606a, 606b may define a channel 610 therebetween. In at least one approach, an inner surface 612 of the retention base 604 cooperates with opposing inner surfaces 614, 616 of the first and second retention arms 606a, 606b to at least partially define the channel 610 therebetween.

The first and second retention arms 606a, 606b may be resiliently deformable retention arms. In this way, the retention arms 606 may be configured to flex relative to the retention base 604.

The first retention arm 606a may include first distal end clip 620. The first distal end clip 620 may extend in a first direction toward the second retention arm 606b. Similarly, the second retention arm 606b may include a second distal end clip 622. The second distal end clip 622 may extend in a second direction opposite the first direction toward the first distal end clip 620. In this way, the opposing distal end clips may extend inwardly at distal portions 624, 626 of the resilient retention arms 606.

The first and second distal end clips 620, 622 may include engagement surfaces 630 that face toward the channel 610 to at least partially define the channel 610. The first and second distal end clips 620, 622 may further include ramped surfaces 632 that face opposite the channel 610.

In at least one approach, the distal portions 624, 626 of the resilient retention arms 606 may define a first planar surface 640 and a second planar surface 642 that may extend from the first planar surface 640 at an oblique angle. The second planar surface 642 may correspond to the ramped surface 632. A third planar surface 644 may extend from the second planar surface 642 at an oblique angle. The third planar surface 644 may extend in a plane substantially orthogonal to the first planar surface 640.

As shown in FIG. 18, the temperature sensor assembly 600 may include a temperature sensor 650. The temperature sensor 650 may be, for example, a thermistor. The temperature sensor 650 may be disposed within the retention base 604. In at least one approach, the temperature sensor 650 may be spring-loaded. In this approach, a spring-loaded temperature sensor may provide additional mechanical force so as to promote engagement of the temperature sensor and one or more windings of a stator.

The temperature sensor assembly 600 may further include a wire guide 652. The wire guide 652 may extend from the retention base 604. For example, the wire guide 652 may extend from the retention base 604, and may extend along an axis substantially parallel to the retention arms 606. One or more lead wires 654 (e.g., two lead wires 654) may extend from the temperature sensor 650 and through the wire guide 652. In the installed configuration, discussed in greater detail elsewhere herein, the wire guide 652 may further extend away from a bridge 704 of a stator 700.

In at least one approach, the retention base 604 may be overmolded about one or both of the temperature sensor 650 and the lead wires 654. In this way, the C-shaped retention housing 602 may be a unitary elastomeric body overmolded around the temperature sensor 650.

Figure 20:
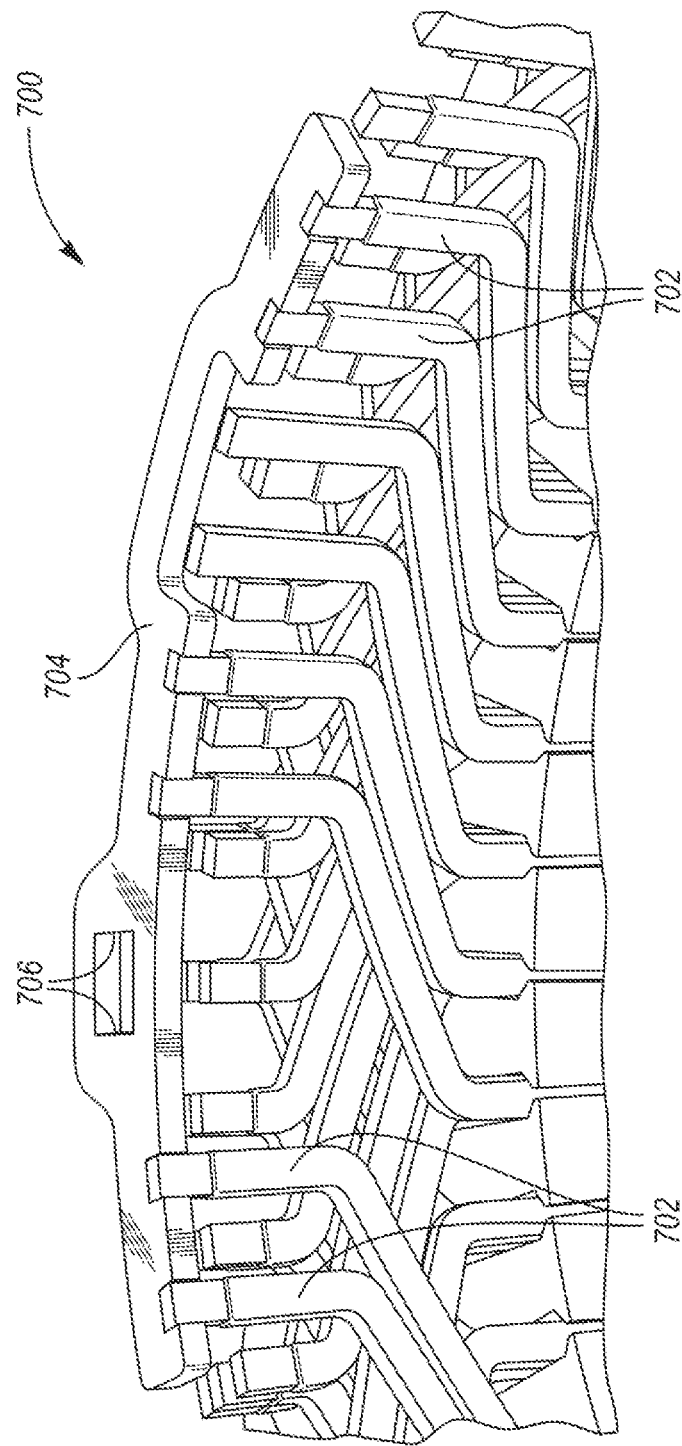
FIG. 20 is a partial perspective view of a stator including windings and a bridge.

Referring momentarily to FIG. 20, an electric machine for an electrified vehicle may include a stator 700. The stator 700 may include windings 702. One or more of the windings 120 may have a cross-section that may be polygonal. More particularly, the cross-section may define a quadrilateral, which may be a parallelogram (e.g., a rectangle, square, rhombus, etc.), trapezoid, kite, etc.

A stator bridge 704 may extend across the windings 702 and in engagement with the windings 702. The bridge 704 may be a component that connects or joins multiple winding endings. In this way, the bridge 704 may be formed as a stamped bridge, bus bar, etc. In at least one approach, the bridge 704 may include aperture walls 706 that may define an aperture extending through the bridge 704. The aperture walls 706 may define a continuous surface that defines the aperture.

As shown in FIG. 20, the bridge 704 may be secured to extended ends of the windings 702, which may be disposed at the "twist side" of the stator 700. The bridge 704 may be fixed to the windings 702; for example, through welding or other suitable fastening approach.

The electric machine may be implemented by any one of a plurality of types of electric machines. By way of one non-limiting embodiment, the electric machine could be a permanent magnet synchronous motor. Power electronics may be configured to condition direct current (DC) power provided by the battery to the requirements of the electric machine. For example, the power electronics may provide three-phase alternating current (AC) to the electric machine.

In at least one exemplary approach, voltage may be applied to a U lead, whereby current may then flow from the U lead to a neutral bridge (e.g., bridge 704) and out of V and W leads. Voltage may then be applied to the V lead, whereby current may then flow from the V lead to the neutral bridge and out of the U and W leads. Voltage may then be applied to the W lead, whereby current may then flow from the W lead to the neutral bridge and out of the U and V leads. Such switches may occur at a high frequency to spin the rotor of the electric machine. A neutral bridge may be a common point between all phases.

Other suitable bridges and electric machine components are expressly contemplated herein for securing a temperature sensor assembly. For example, a temperature sensor assembly (e.g., assembly 600) may be secured to a jumper bridge of an electric machine. A jumper bridge may connect two or more winding circuits together in series. In still another example, a temperature sensor assembly (e.g., assembly 600) may be secured to a conductor. Such other suitable bridges and electric machine components may be provided with any one or more of the temperature sensor assemblies discussed herein.

As shown in FIG. 18, an adhesive 710 may be disposed between the retention housing 602 and the bridge 704. For example, the adhesive 710 may be disposed between the base 604 and a side surface of the bridge 704. The adhesive 710 may also, or instead, be disposed between the retention arms 606 and opposing planar surfaces of the bridge 704. In at least one approach, the adhesive may be a thermoset adhesive, such as an epoxy, or including a thermoplastic polymer, such as polyamide.

A method of securing a temperature sensor to an electric machine may include applying an adhesive 710 to an inner surface (e.g., inner surface 612) of a temperature sensor assembly 600, and/or to a surface of a bridge 704. The method may include engaging the bridge 704 with resiliently flexible arms 606 of the temperature sensor assembly 600 to deform the resiliently flexible arms. Engaging the bridge 704 with resiliently flexible arms 606 may include engaging the bridge 704 with sloped outer surfaces (e.g., surfaces 644) of the resiliently flexible arms 606.

The method may further include engaging the bridge 704 with the inner surface 612. When the inner surface 612 is engaged with the bridge 704, the resiliently flexible arms 606 may be returned to a non-deformed (non-flexed) configuration.

In at least one approach, after engaging the bridge with the inner surface, the method may further include curing the thermoset adhesive.

Referring to FIG. 19, in the installed configuration, the retention base 604 may engage the bridge 704 at a side surface 720 of the bridge. The retention arms 606 may engage the bridge 704 at opposing planar surfaces 722 that may extend generally orthogonal to the side surface 722.

Opposing distal end clips 620, 622 that extend from distal portions of the retention arms 606 may be disposed in engagement with the bridge 704. The opposing distal end clips 620, 622 may engage the bridge 704 at an opposing side surface 724 that may extend generally parallel to the side surface 720. Furthermore, the opposing distal end clips 620, 622 may extend into the aperture defined by the aperture walls 706 of the bridge 704.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine for an electrified vehicle, comprising:
    a stator including windings and a bridge extending across the windings and in engagement with the windings;
    a temperature sensor assembly secured to the bridge and including
        a retention housing having a base and spaced apart retention arms extending from the base, and
        a temperature sensor disposed within the retention housing; and
    an adhesive disposed between the retention housing and the bridge.

2. The electric machine of claim 1 wherein the adhesive is disposed between the base and a side surface of the bridge.

3. The electric machine of claim 1 wherein the adhesive is disposed between the retention arms and opposing planar surfaces of the bridge.

4. The electric machine of claim 1 wherein the base engages the bridge at a side surface of the bridge, and wherein the retention arms engage the bridge at opposing planar surfaces that extend generally orthogonal to the side surface.

5. The electric machine of claim 1 wherein the temperature sensor assembly further includes a wire guide that extends from the base and away from the bridge.

6. The electric machine of claim 1 wherein the retention housing further includes opposing distal end clips extending from distal portions of the retention arms and disposed in engagement with the bridge.

7. The electric machine of claim 6 wherein the base engages the bridge at a side surface of the bridge, and wherein the opposing distal end clips engage the bridge at an opposing side surface that extends generally parallel to the side surface.

8. The electric machine of claim 7 wherein the bridge defines an aperture extending therethrough, and wherein the opposing distal end clips extend into the aperture.

9. The electric machine of claim 1 wherein the adhesive is a thermoset adhesive.

10. A method of securing a temperature sensor to an electric machine, comprising:
    applying an adhesive to an inner surface of a temperature sensor assembly that houses the temperature sensor or a surface of a bridge that extends across windings of a stator;
    engaging the bridge with resiliently flexible arms of the temperature sensor assembly to deform the resiliently flexible arms; and
    engaging the bridge with the inner surface.

11. The method of claim 10 wherein engaging the bridge with resiliently flexible arms includes engaging the bridge with sloped outer surfaces of the resiliently flexible arms.

12. The method of claim 10 wherein when the inner surface is engaged with the bridge, the resiliently flexible arms are returned to a non-deformed configuration.

13. The method of claim 10 further comprising:
after engaging the bridge with the inner surface, curing the adhesive.

14. A temperature sensor assembly for an electric machine, comprising:
a C-shaped retention housing including
a retention base,
spaced apart resilient retention arms extending from the retention base, and
opposing distal end clips extending inwardly at distal portions of the resilient retention arms;
a temperature sensor disposed within the retention housing; and
a wire guide extending from the retention housing.

15. The temperature sensor assembly of claim 14 wherein the retention arms include a first retention arm and a second retention arm spaced from the first retention arm, and wherein an inner surface of the retention base cooperates with opposing inner surfaces of the first and second retention arms to at least partially define a channel therebetween.

16. The temperature sensor assembly of claim 14 wherein the C-shaped retention housing is a unitary elastomeric body overmolded around the temperature sensor.

17. The temperature sensor assembly of claim 14 wherein the temperature sensor is a thermistor.

18. The temperature sensor assembly of claim 14 wherein the temperature sensor is disposed within the retention base, and wherein the wire guide extends from the retention base, the temperature sensor assembly further including a lead wire extending from the temperature sensor and through the wire guide.

19. The temperature sensor assembly of claim 14 wherein the opposing distal end clips include ramped surfaces that face opposite a channel at least partially formed by the retention arms.

20. The temperature sensor assembly of claim 14 wherein a distal portion of an individual resilient retention arm defines a first planar surface, a second planar surface extending from the first planar surface at an oblique angle, and a third planar surface extending from the second planar surface at an oblique angle and extending in a plane substantially orthogonal to the first planar surface.

* * * * *